Aug. 5, 1969   H. A. FAERBER   3,459,314
CONFECTIONERY MOULDING MACHINES
Filed May 22, 1967   4 Sheets-Sheet 1
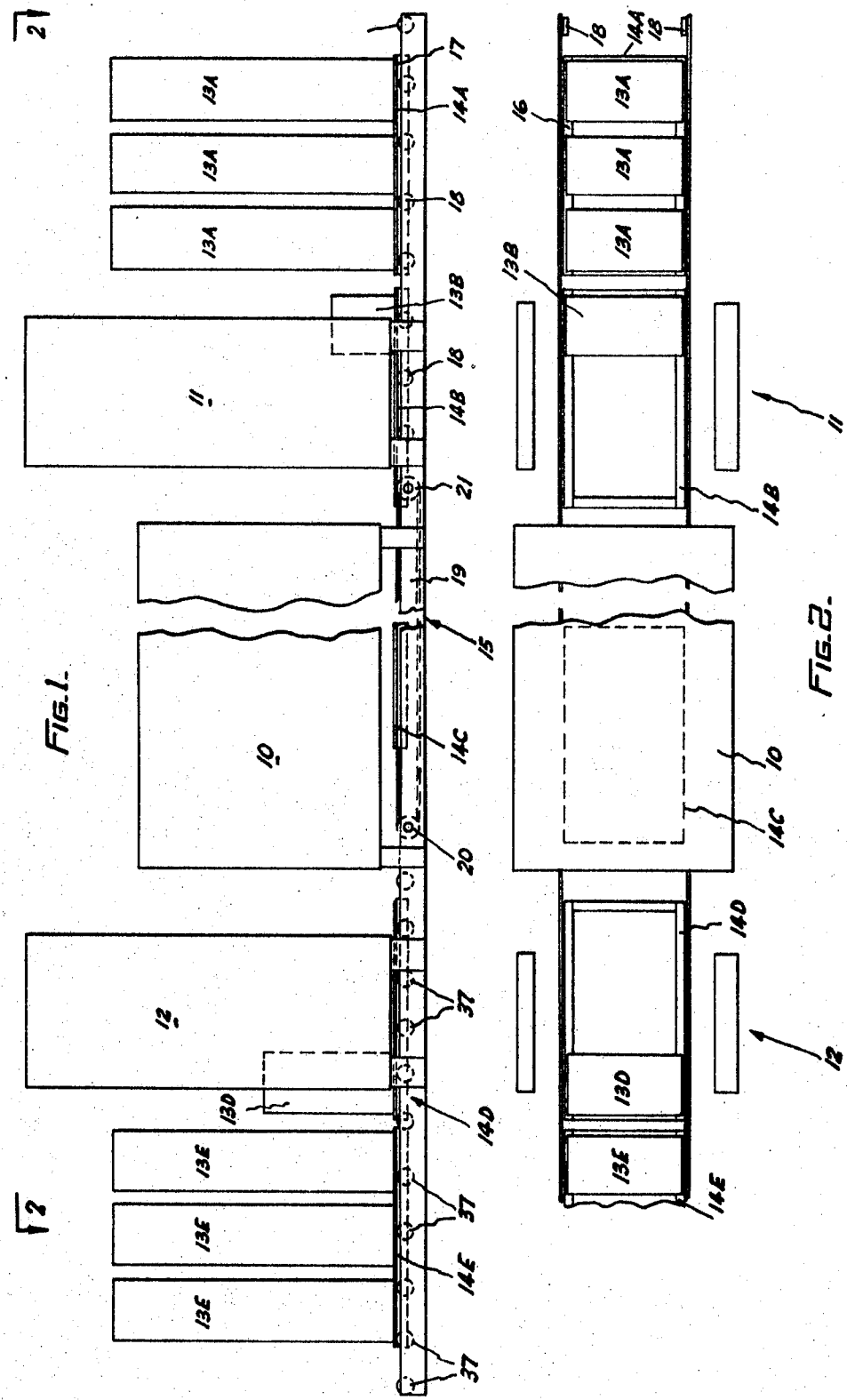

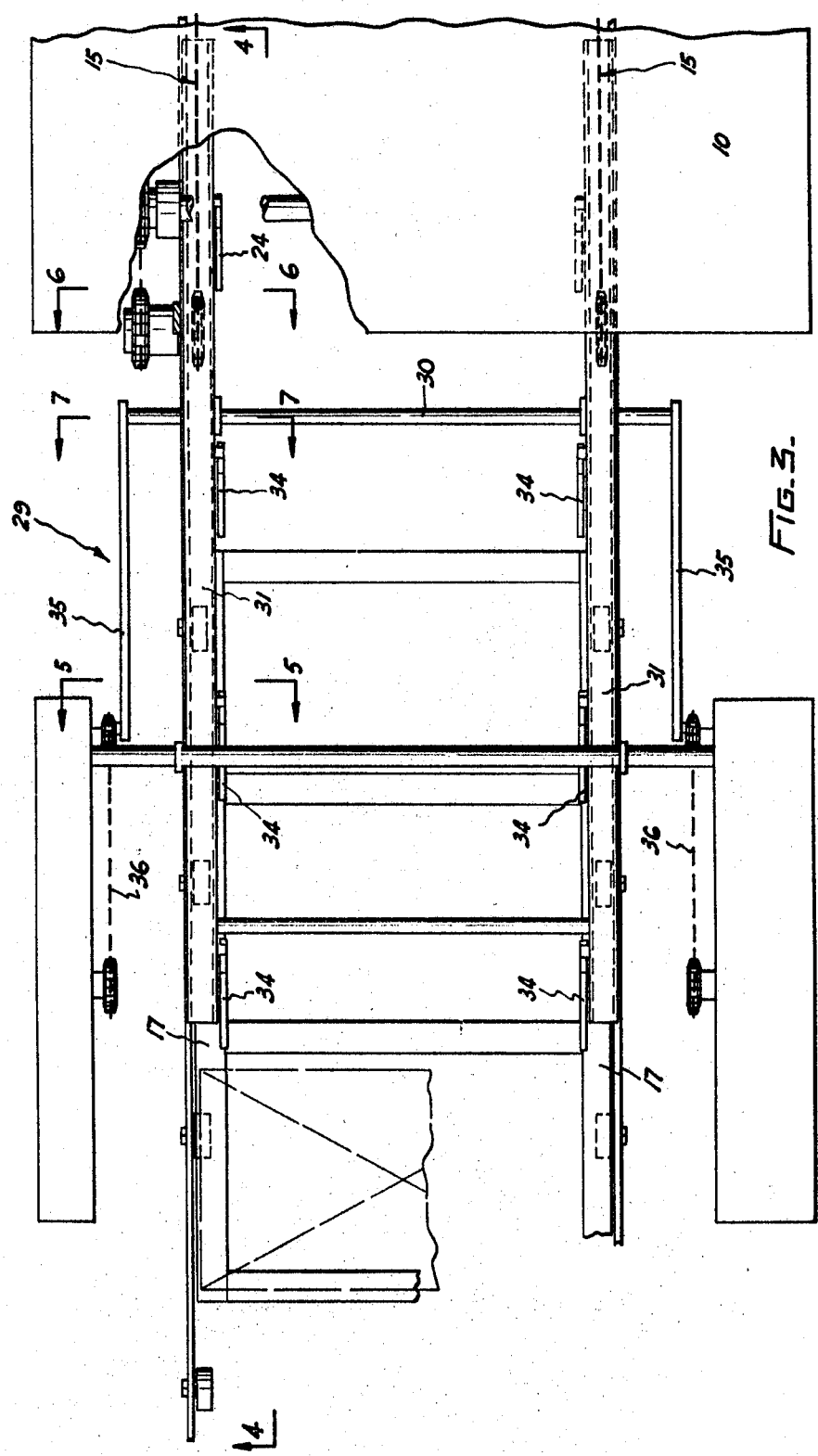

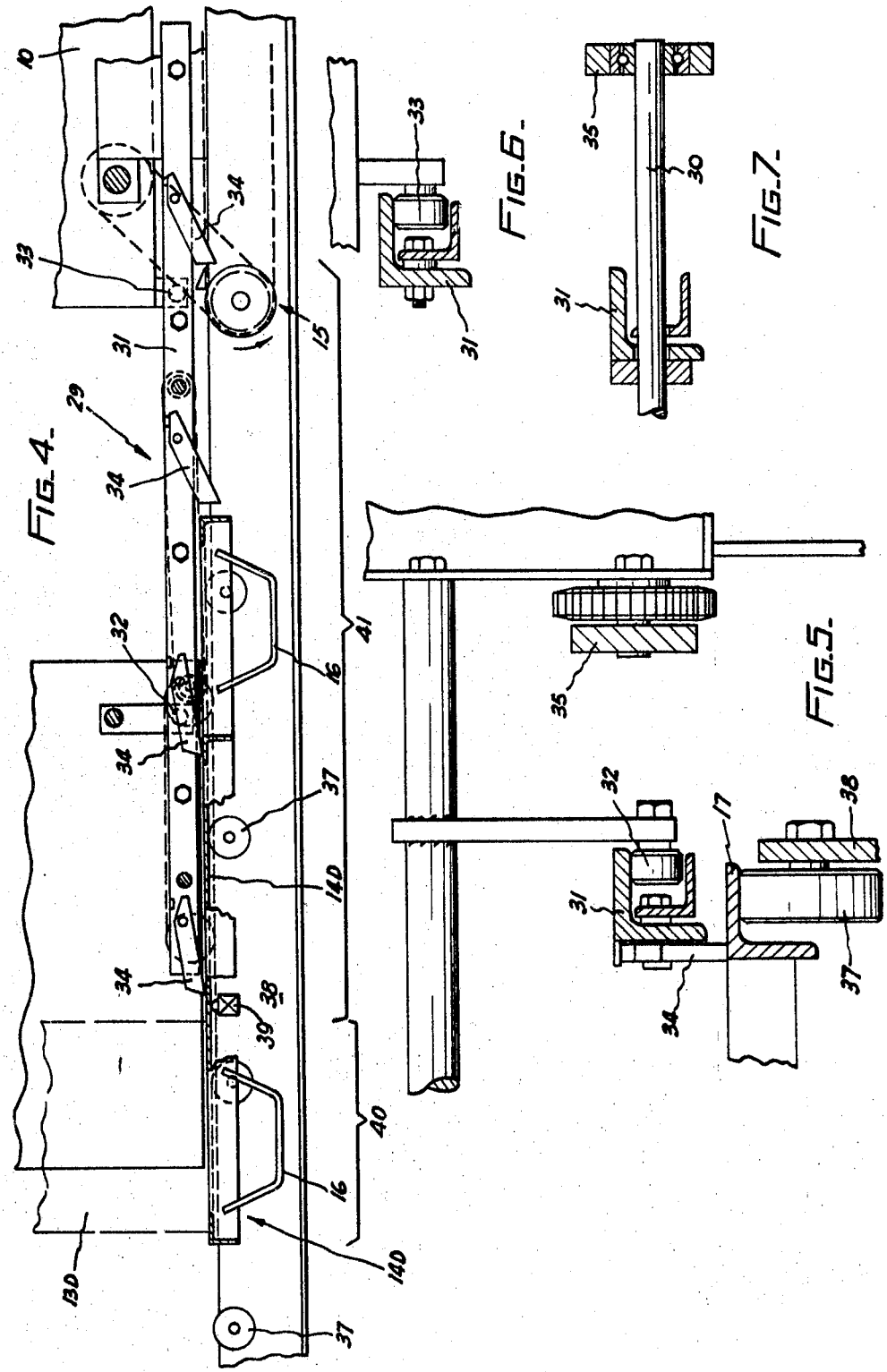

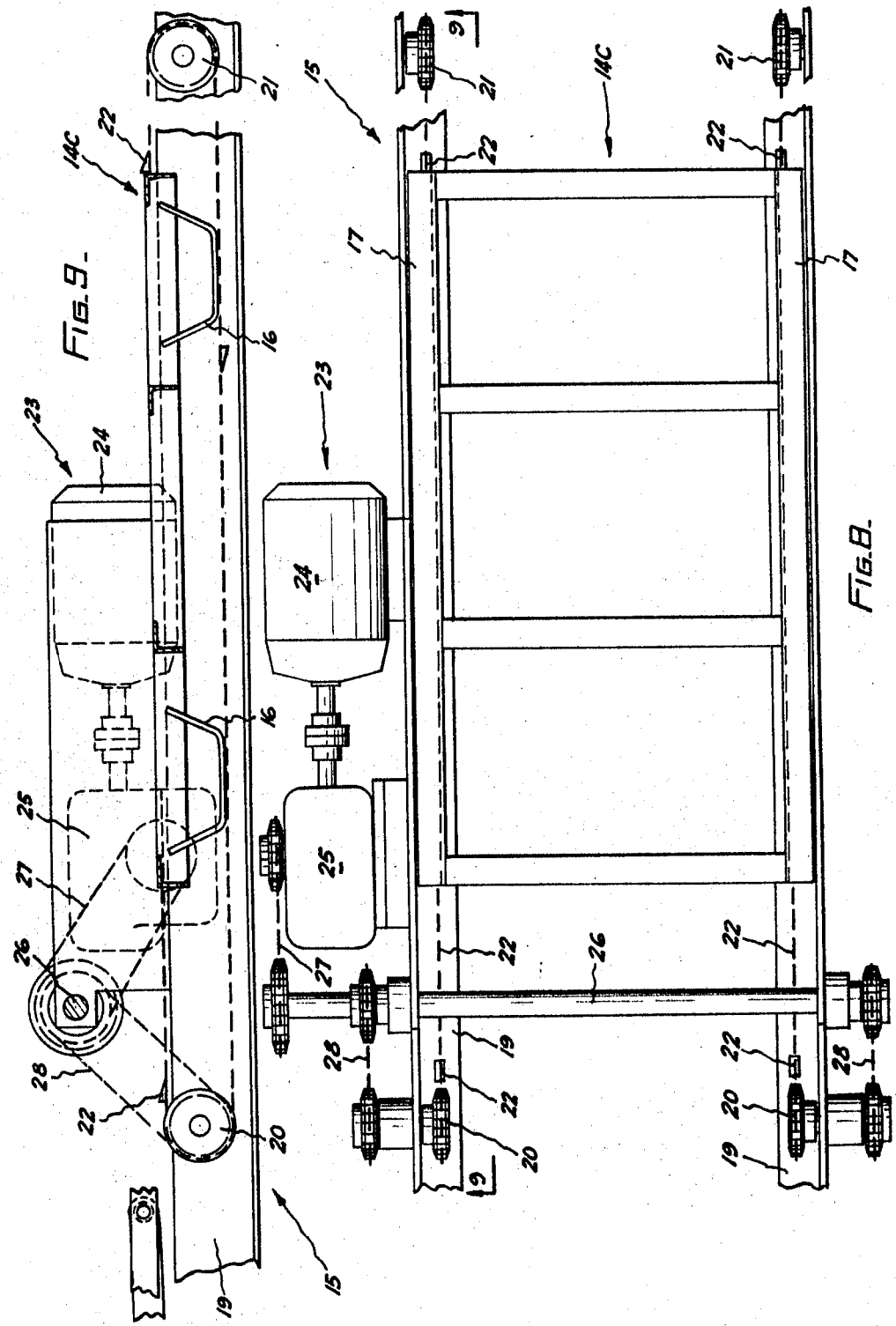

United States Patent Office 3,459,314
Patented Aug. 5, 1969

3,459,314
CONFECTIONERY MOULDING MACHINES
Hans A. Faerber, 69 Headlands Road, Castle Cove, near Sydney, New South Wales, Australia
Continuation-in-part of application Ser. No. 548,133, May 6, 1966. This application May 22, 1967, Ser. No. 640,185
Claims priority, application Australia, Apr. 19, 1966, 4,398/66
Int. Cl. B65g 57/02
U.S. Cl. 214—6          4 Claims

ABSTRACT OF THE DISCLOSURE

In the combination of a confectionary starch moulding machine, a loader for feeding the moulding machine with trays from a stack of trays resting on a pallet and a stacker which accepts trays from the moulding machine and restacks same, a conveyor is provided for the transfer of empty tray pallets from the loader to the stacker. The conveyor is of the kind which positively shifts a pallet when in operation but which permits pallets to slide freely along it if pushed by an outside agency in the normal direction of pallet travel. Means are provided to energize the conveyor to bring a fresh pallet to the stacker during the building of the last stack of trays to be built on the preceding pallet.

CROSS REFERENCE TO RELATED APPLICATIONS

This application is a continuatin-in-part of our earlier application, for an invention entitled "Stacking Machine," No. 548,133 of May 6, 1966. Reference should also be made to application 548,132 of May 6, 1966, for an invention entitled, "Loading Machine." by the present application as a loading machine as described in application 548,132 is referred to herein as an element of an overall installation incorporating the present invention.

BACKGROUND OF THE INVENTION

Field of the invention

The invention relates to the manufacture of moulded confectionery by means of a starch moulding machine and in particular, to the mechanical handling of the pallets on which moulding trays are delivered to and removed from the machine.

Description of the prior art

Very briefly stated a confectionery starch moulding machine, commonly referred to as a starch moulding machine in the art, accepts shallow trays filled with starch powder with cast confections sitting therein, empties the trays, separates the confections from the starch, refills the trays with starch, forms mould cavities in the surfaces of the starch, fills those cavities with a settable confectionery material and discharges the trays to enable the material to set; whereupon the trays with the cast confectionery in them, are once more returned to the starting point and fed into the machine for a further manufacturing cycle.

Usually a tray loading machine and a tray stacking machine are associated with the Starch Moulding machine. The tray loading machine accepts a stack of trays upon a pallet, feeds the trays into the Starch Moulding machine and then ejects the empty pallet.

The stacking machine on the other hand, claims an empty pallet and then accepts trays one at a time from the starch moulding machine, stacks same upon the pallet at a stack forming station and finally ejects the loaded pallet. Hitherto the task of transferring the empty pallets ejected by the loading machine to the stacking machine has been done by hand, or at least by means controlled by a human operator, and this has been regarded as essential because of the overriding need to ensure that the stacking machine is never short of a pallet, notwithstanding that the ratio of pallet throughput to tray throughput varies from run to run and because the pallets presented to the loader may or may not be stacked to the full height, whereas the pallets leaving the stacking machine is usually stacked to the full height. The object of the present invention is to provide for automatic transfer of pallets from the loader to the stacker, notwithstanding the variation in pallet and tray throughputs which may occur from time to time.

SUMMARY OF THE INVENTION

The invention fulfills the abovementioned objects by providing a pallet storage and delivery conveyor able to receive pallets from the loader and to carry them to the stacker on which conveyor a plurality of pallets may be stored to enable fluctuations in pallet throughput to be accommodated. The conveyor is functionally combined with the stacking machine in that the conveyor operates to feed a fresh pallet to the stacking machine when and only when, a pallet sensing element in the stacking machine senses that its pallet receiving station is vacant. Pallets fed to the pallet receiving station are then advanced in steps through the stacking machine to permit a plurality of stacks of trays to be successively formed on the pallet at the stack forming station of the stacking machine.

The invention consists in the provision, in combination with a stacking machine of the kind including reciprocating pallet transfer devices for the progression of pallets from a pallet receiving station through the stacking machine, of pallet supply means comprising a conveyer able to positively deliver an empty pallet to the pallet receiving station, and being such that the pallets may be pushed along the conveyer path toward the pallet receiving station even though the conveyer may not be in operation at the time. The conveyer includes drive means having a pallet sensing element which puts the conveyer into operation whenever the receiving station falls vacant, and continues the operation until such time as the conveyer delivers an empty pallet to the receiving station. The construction of the conveyer is such that a pallet may be pushed along the conveyer regardless of whether or not the conveyer is in operation at the time.

BRIEF DESCRIPTION OF THE DRAWINGS

FIGURE 1 is a diagrammatic side elevation of a starch moulding machine with its associated loading machine and stacking machine, the last mentioned machine being provided with pallet supply means according to the invention.

FIGURE 2 is a diagrammatic plan view taken on line 2—2 of FIGURE 1.

FIGURE 3 is a plan view of the pallet receiving station and the stacking machine of FIGURE 1.

FIGURE 4 is a sectional side elevation of the receiving station of FIGURE 3 as seen on line 4—4 of FIGURE 3.

FIGURE 5 is a sectional view taken on line 5—5 of FIGURE 3.

FIGURE 6 is a sectional view taken on line 6—6 of FIGURE 3.

FIGURE 7 is a sectional view taken on line 7—7 of FIGURE 3.

FIGURE 8 is a plan view of a pallet conveyor being a component of the pallet supply means of FIGURE 1.

FIGURE 9 is a side elevation of the conveyor of FIGURE 8.

DESCRIPTION OF THE PREFERRED EMBODIMENT

The installation illustrated in the drawings comprises a starch moulding machine 10 with its associated tray loading machine 11 and stacking machine 12 (in FIGURES 2, 3 and 4 those components of the loading machine 11 and stacking machine 12 not associated with the transfer of pallets through the machines are not shown).

Three stacks of trays 13A are shown on a pallet 14A in position ready to be claimed by the loading machine 11. A second pallet 14B with portion of a stack 13B of trays still on it is shown in the pick-up position for the loading machine 11, that is to say the position wherein the stack 13B is placed for transference by the loading machine 11 into the starch moulding machine 10.

When the loading machine 11 completes the loading of stack of trays thereon are progressed as aforesaid by pitch towards the left (as seen in FIGURES 1 and 2) to bring the foremost stack 13A into the pick-up position. Subsequently, once the foremost stack 13A has been loaded the loading machine 11 brings the next stack 13B into the pick-up position and repetitions of this process cause the emptied pallets, exemplified by pallets 14C to be ejected on to a pallet supply conveyor 15.

The means whereby the pallets 14A and 14B and the stack of trays thereon are progressed as aforesaid by the loading machine 11 do not constitute a part of the present invention and if further information concerning them is required reference should be made to the specification belonging to patent application 548,132.

It should be mentioned however, that the pallets 14 vary from those described in application 548,132 in that each is long enough to accommodate three stacks of trays and comprises an angle-iron frame with four feet 16 and with outwardly directed longitudinally extending support flanges 17 enabling the pallets to be supported clear of the floor upon rollers 18 as they travel through the loading machine 11. Similar arrangements are provided for the support of the pallets 14 as they travel through the stacking machine 12 and those arrangements will be described and illustrated in more detail hereinafter.

The conveyor 15 comprises two longitudinally extending frame members 19 (which may be secured to or integral with the side plates of the loading machine 11 which support the rollers 18), head sprockets 20, tail sprockets 21, endless conveyor chains 22 riding upon the respective pairs of head sprockets 20 and tail sprockets 21, pusher dogs 22 on the chains 21 and driving means 23 adapted to rotate the head sprockets 20. The driving means 23 comprise an electric motor 24, a gear box 25, a cross shaft 26, an endless chain drive 27 connecting the gear box 25 to the cross shaft 26 and endless chain drives 28 connecting the cross shaft 26 to the respective head sprockets 20.

The dogs 22 are tapered or wedge shaped to provide an abutment face adapted to contact the back end of a pallet 14 for its positive conveyance with the chains 22 whenever the conveyor 15 is operating but which present little obstruction to the sliding of a pallet along the chains 22 towards the head sprockets 20. Thus the conveyor 15 is able to accept empty pallets from the loading machine 11 even though the conveyor is stationary at the time.

The conveyor 15 is of such a length it will deliver pallet 14C into the pallet receiving station of the stacking machine 12. That is to say into the position where it may be claimed by the pallet transfer devices of the stacking machine. The said pallet transfer devices of the stacking machine 12 comprise a reciprocating pusher frame 29 which is similar in construction to the pusher frame 75 described in the parent specification. Thus the pusher frame 29 comprises a cross-bar 30, two longitudinally extending pallet transfer bars 31, supported for deciprocating movement upon supporting rollers 32 and 33 and a plurality of pusher pawls 34 fulcrumed on the transfer bars 31 and able to swing downwardly to engage a pallet to be transferred thereby but able to swing upwardly to ride over the pallet during the return stroke of the reciprocating frame 29.

The pusher frame 29 is caused to reciprocate by means of two connecting rods 35 extending from the respective ends of the cross bar 30 to anchorages on pusher frame drive chains 36, all as described in more detail in the parent specification.

Each reciprocation of the pusher frame 29 causes the pallet being stacked with trays to be shifted forward by one stack pitch, and the transfer bars 31 are of such a length and provided with sufficient pawls 34 to eject a pallet, such as pallet 14E of FIGURE 1, when completely loaded with trays and engage an empty pallet in the pallet receiving station.

The pallets 14E and 14D are supported, as they are moved by the above described pallet transfer means, upon rollers 37 on side members 28 similar in all respects to the rollers 18 and side members of the loading machine 11. Therefore the side members 38 may be integral with the conveyor frame members 19 so that the entire pallet transfer from the input station of the loading machine to the output station of the stacking machine may be effected by means which may be regarded as a single apparatus comprising the pallet transfer means of the loading machine, the pallet delivery conveyor and the pallet transfer means of the stacking machine.

Pallet 14D is shown in FIGURE 1 with a first stack 13D of trays being formed on the forward portion of the pallet at the stack forming station indicated by the bracket 40 in FIG. 4. When the first stack 13D is finished the pallet transfer means operate to shift pallet 14D to shift the intermediate portion thereof to the stack forming station to enable an intermediate stack 13D (not shown) to be built on it, and once the intermediate stack is built the pallet moves again to enable a last stack 13D (not shown) to be built. As soon as the final segment of pallet 14D moves into the stack forming position for the building of the last stack thereon it moves clear of a self closing control switch 39 which hitherto has been held open by the pallet 14D. This switch 39 constitutes a pallet sensing element which serves—if necessary by way of a conventional electrically operated motor starter or contactor—to energise the motor 24 as soon as pallet 14D moves into position to receive its last stack. Therefore the conveyor 15 then operates to deliver a fresh empty pallet into the pallet receiving position (indicated by the bracket 41 in FIG. 4) in which the trailing edge of the pallet is immediately ahead of the rear-most pair of dogs 34 and the front of the pallet is adjacent to the rear of pallet 14D. The newly delivered pallet in the receiving station depresses switch 39 and so de-energises the conveyor 15.

It will be seen that the conveyor has plenty of time to deliver a fresh pallet (even if there are not many pallets stored on it, so that the fresh pallet has to be brought all the way from the loading machine 11) because the time available is that needed for the building of a complete stack by the stacking machine 12. Thus, the pallet sensor, the pallet receiving station, and the pallet storage and delivery conveyor cooperate to anticipate the pallet stacking machine's need for another pallet, and to deliver the pallet from the conveyor to the pallet receiving station in postion to be indexed (by the reciprocating pusher conveyor) into position to receive the first stack of trays at the stack forming station.

If desired the pallet transfer devices of the stacking machine may be extended—and the pallet supply conveyor correspondingly shortened—to enable the empty pallet to be delivered to the pallet receiving station at an earlier stage, for example, at the commencement of the building of the second stack on the pallet being loaded.

Whereas the above described embodiment of the invention is adapted for handling pallets able to accommodate three stacks of trays, it will be appreciated that other embodiments of the invention may handle other sizes and styles of pallet, for example, pallets supporting only one stack of trays. Furthermore, the pallets may be provided with ground wheels, or the like, so that they are in the nature of trolleys or sleds, in which event the conveyor chains may be disposed one each side of the pallet or above the pallet. In those instances in which the conveyor chains are disposed above the pallets, pivotedly mounted driving dogs may be utilised, which hang downwardly from the chain to engage the pallets for driving same but which are able to swing upwardly to allow a pallet to pass under the dog when overtaking the dog.

I claim:

1. In a confectionery tray stacking machine for successively forming a plurality of stacks of confectionery trays on a pallet at a stack forming station, an empty pallet storage and feeding mechanism for supplying pallets to said stack forming station comprising, in combination, an empty pallet receiving station adjacent said stack forming station, pallet indexing means including reciprocating conveyor means for advancing an empty pallet from said receiving station through said stack forming station in predetermined steps to permit a plurality of vertical stacks to be successively formed on the pallet in side-by-side relation, said reciprocating conveyor being operable to advance a pallet one step upon completion of each stack, a pallet storage and delivery conveyor for delivering pallets one at a time to said pallet receiving station, pallet sensing means at said pallet receiving station for sensing the movement of a pallet by said indexing means from said pallet receiving station into position to receive the last stack to be formed thereon, and drive means operable in response to said sensing means for operating said storage and delivery conveyor to deliver an empty pallet to said receiving station during the formation of the final stack on the previous pallet, whereby operation of said indexing means following the completion of the final stack on a pallet will index the empty pallet from said receiving station into position to receive the initial stack thereon and simultaneously discharge the loaded pallet from said stacking machine.

2. The invention as defined in claim 1 wherein said pallet storage and delivery conveyor comprises a frame, a plurality of rollers mounted on said frame and defining an elongated conveyor path capable of receiving and supporting a plurality of empty pallets, said rollers being freely rotatable in a direction to permit pallets to move along said conveyor path toward said receiving station independently of said drive means.

3. The invention as defined in claim 2 wherein said drive means comprises pallet engaging means independent of said rollers, said pallet engaging means being movable along said path to positively move a pallet supported on said path toward said receiving station, said pallet engaging means permitting pallets supported on said conveyor path to move along said path toward said receiving station when said drive means is not in operation.

4. The invention according to claim 3 wherein said drive means comprises an endless chain, means driving said chain about a path including a segment parallel to said conveyor path, and dog means carried by said chain in position to engage pallets supported on said conveyor path, said dog means being capable of permitting pallets to overrun said chain whether or not said chain is being driven.

References Cited

UNITED STATES PATENTS

| | | | |
|---|---|---|---|
| 1,736,935 | 11/1929 | Navarre | 198—221 |
| 2,028,410 | 1/1936 | Rapisarda. | |
| 2,701,650 | 2/1955 | Stevenson. | |
| 3,101,852 | 8/1963 | Pearne. | |
| 3,127,981 | 4/1964 | Sharpe | 214—6 X |
| 3,151,753 | 10/1964 | Verrinder et al. | |
| 3,178,053 | 4/1965 | Robinson. | |
| 3,181,712 | 5/1965 | Von Gal. | |
| 3,310,183 | 3/1967 | Paquette. | |

GERALD M. FORLENZA, Primary Examiner

R. J. SPAR, Assistant Examiner

U.S. Cl. X.R.

198—37, 221